United States Patent
Xie et al.

(10) Patent No.: US 10,052,609 B2
(45) Date of Patent: Aug. 21, 2018

(54) TOWER PACKING ELEMENT, TOWER PACKING, AND PACKING TOWER AND MIXER COMPRISING THE SAME

(71) Applicant: Beijing Zehua Chemical Engineering Co., Ltd., Beijing (CN)

(72) Inventors: Runxing Xie, Beijing (CN); Hongping Tang, Beijing (CN); Jiazhuo Lv, Beijing (CN); Changzhi Wang, Beijing (CN)

(73) Assignee: BEIJING ZEHUA CHEMICAL ENGINEERING CO., LTD., Beijing (CN)

( * ) Notice: Subject to any disclaimer, the term of this patent is extended or adjusted under 35 U.S.C. 154(b) by 211 days.

(21) Appl. No.: 14/759,830

(22) PCT Filed: Feb. 26, 2014

(86) PCT No.: PCT/CN2014/072575
§ 371 (c)(1),
(2) Date: Jul. 8, 2015

(87) PCT Pub. No.: WO2015/027694
PCT Pub. Date: Mar. 5, 2015

(65) Prior Publication Data
US 2015/0336079 A1 Nov. 26, 2015

(30) Foreign Application Priority Data

Aug. 30, 2013 (CN) .......................... 2013 1 0389841

(51) Int. Cl.
*B01J 19/32* (2006.01)
*B01J 19/30* (2006.01)
(Continued)

(52) U.S. Cl.
CPC ........... *B01J 19/30* (2013.01); *B01F 3/04496* (2013.01); *B01F 3/04985* (2013.01);
(Continued)

(58) Field of Classification Search
CPC .............. B01F 3/04496; B01F 3/04985; B01F 5/0695; B01J 19/30; B01J 19/32;
(Continued)

(56) References Cited

U.S. PATENT DOCUMENTS 3,158,527 A * 11/1964 Faccin et al. ......... B31F 1/2895
156/207
3,229,763 A * 1/1966 Rosenblad ............ F28D 9/0087
165/166

(Continued)

FOREIGN PATENT DOCUMENTS

| CN | 1098331 A | 2/1995 |
|---|---|---|
| CN | 2291203 Y | 9/1998 |

(Continued)

OTHER PUBLICATIONS

International Search Report and Written Opinion for Application No. PCT/CN2014/072575 dated Jun. 5, 2014.

*Primary Examiner* — Charles Bushey
(74) *Attorney, Agent, or Firm* — Hodgson Russ LLP

(57) ABSTRACT

A tower packing element, a tower packing, a packing tower, and a mixer comprising the tower packing element are provided. The tower packing element are manufactured by a deformed plate and comprises a plurality of strip assemblies arranged along a longitudinal direction of the tower packing element and a connecting plate portion connected between adjacent strip assemblies. Each of the strip assemblies defines a central passage therein, and the central passage is extended in a lateral direction of the tower packing element. The connecting plate portion is extended along the lateral
(Continued)

direction of the tower packing element. The adjacent strip assemblies and the connecting plate portion connected therebetween define a side passage parallel to the central passage.

19 Claims, 7 Drawing Sheets

(51) Int. Cl.
 *B01F 3/04* (2006.01)
 *B01F 5/06* (2006.01)
(52) U.S. Cl.
 CPC ............. *B01F 5/0695* (2013.01); *B01J 19/32* (2013.01); *B01J 2219/3221* (2013.01); *B01J 2219/32213* (2013.01); *B01J 2219/32237* (2013.01); *B01J 2219/32272* (2013.01); *B01J 2219/32408* (2013.01); *B01J 2219/32425* (2013.01); *B01J 2219/32483* (2013.01); *B01J 2219/32491* (2013.01); *B01J 2219/33* (2013.01)
(58) Field of Classification Search
 CPC ...... B01J 2219/3221; B01J 2219/32213; B01J 2219/32237; B01J 2219/33; B01J 2219/32408; B01J 2219/32425; B01J 2219/32483; B01J 2219/32491; B01J 2219/32272
 USPC .............................. 261/112.1, 112.2, DIG. 72
 See application file for complete search history.

(56) References Cited

U.S. PATENT DOCUMENTS

| | | | | |
|---|---|---|---|---|
| 3,311,356 | A * | 3/1967 | Eckert | B01J 19/30 261/94 |
| 3,652,066 | A * | 3/1972 | Faigle | B01J 19/32 261/109 |
| 4,497,751 | A * | 2/1985 | Pluss | B01D 3/24 261/112.1 |
| 4,497,752 | A * | 2/1985 | Huber | B01F 5/0616 165/60 |
| 4,497,753 | A * | 2/1985 | Streiff | B01D 3/24 165/60 |
| 4,575,435 | A * | 3/1986 | Kuhl | B01J 19/30 261/94 |
| 4,600,544 | A * | 7/1986 | Mix | B01F 5/0616 202/158 |
| 4,942,889 | A * | 7/1990 | Grollimund | A24D 1/02 131/358 |
| 5,490,958 | A * | 2/1996 | Lim | B01J 19/32 261/112.1 |
| 5,543,088 | A * | 8/1996 | Halbirt | B01J 19/30 261/94 |
| 5,882,772 | A | 3/1999 | Schultes | |
| 6,299,999 | B1 * | 10/2001 | Buchner | F28F 3/027 429/434 |
| 6,409,378 | B1 * | 6/2002 | Kessler | B01J 19/32 261/112.2 |
| 7,332,132 | B2 * | 2/2008 | Hedrick | C10G 11/18 422/144 |
| 9,186,648 | B2 * | 11/2015 | Wolf | B01J 19/32 |
| 2007/0197382 | A1 * | 8/2007 | West | F01N 3/2814 502/240 |
| 2008/0245651 | A1 | 10/2008 | Werlen et al. | |

FOREIGN PATENT DOCUMENTS

| | | |
|---|---|---|
| CN | 1965206 A | 5/2007 |
| CN | 201537490 U | 8/2010 |
| CN | 202638432 U | 1/2013 |
| CN | 103480321 A | 1/2014 |

* cited by examiner

TOWER PACKING ELEMENT, TOWER PACKING, AND PACKING TOWER AND MIXER COMPRISING THE SAME

CROSS REFERENCE TO RELATED APPLICATION

The present application is a national phase entry under 35 U.S.C. § 371 of International Application No. PCT/CN2014/072575, filed on Feb. 26, 2014, which claims priority from Chinese Application No. 201310389841.1, filed on Aug. 30, 2013, all of which are hereby incorporated herein by reference.

FIELD

Embodiments of the present invention generally relate to chemical devices, more particularly to a tower packing element, a tower packing comprising the tower packing element, a packing tower and a mixer comprising the tower packing.

BACKGROUND

Packing towers are used to transfer a gas-liquid stream or a liquid-liquid stream by means of continuous contact. Tower packings in the packing tower play a key role in mass or heat transfer, and the flowing passages of the gas-liquid stream or the liquid-liquid stream, as well as the transferring method are determined by the tower packings. There are two types of tower packings, including a random tower packing and a structured tower packing. The random tower packing is composed of a plurality of tower packings packed in the packing tower randomly. As passages for gas and liquid in the random tower packing is not straight, the flowing distance for the gas or liquid stream in the packing tower are long. Further, the random tower packing holds a large quantity of liquid, such that a contact time between the gaseous phase and the liquid phase of the stream is long, which increases the turbulent intensity of the contacting surface between the gaseous phase and the liquid phase of the stream, and finally improves the mass or heat transferring efficiency. As described above, the random tower packing is advantageous in an absorption process with chemical reactions or with a condition of a high pressure system or a large quantity of liquid loading. However, the random tower packing has a small specific surface area which causes a great resistance during the flowing of the stream. In this condition, a diameter-height ratio of the random tower packing is increased so that the random tower packings may be achieved regularly as far as possible. In addition, a wall of the tower packing is further broadened in order to reduce a pressure drop of the random tower packing and improve the processing capacity and efficiency of the random tower packing.

The structured tower packing is composed of a plurality of tower packings arranged in the packing tower regularly and each having a uniform shape. The structured tower packings define a regular passage for the gas stream and the liquid stream, such that the pressure drop therein is small. Further, compared with the random tower packing with an equal specific surface area, the structured tower packing holds a smaller quantity of liquid and has a higher processing capacity.

SUMMARY

Embodiments of the present invention seek to solve at least one of the problems existing in the prior art to at least some extent. Accordingly, an object of the present invention is to provide a tower packing element, which may increase the amount of liquid held by the tower packing, so as to increase the contact time between the gaseous phase and the liquid phase of a transferred gas-liquid stream or between the liquid phases of a transferred liquid-liquid stream and improve the processing capacity of the tower packing.

Another object of the present invention is to a tower packing having the tower packing element.

A further object of the present invention is to provide a packing tower or a mixer having the tower packing.

According to embodiments of a first aspect of the present invention, a tower packing element is provided. The tower packing element is manufactured by a deformed plate and comprises: a plurality of strip assemblies arranged along a longitudinal direction of the tower packing element, each of the strip assemblies defining a central passage therein, and the central passage being extended in a lateral direction of the tower packing element, and a connecting plate portion connected between adjacent strip assemblies and extended along the lateral direction of the tower packing element, wherein the adjacent strip assemblies and the connecting plate portion connected therebetween define a side passage parallel to the central passage.

According to embodiments of the present invention, the tower packing element has a structure similar to that of a random tower packing. With the tower packing element according to embodiments of the present invention, the amount of liquid held by the tower packing as well as the contact time between the gaseous phase and the liquid phase of the transferred gas-liquid stream or between the liquid phases of the transferred liquid-liquid stream are both increased, thus improving the mass/heat transferring efficiency of the tower packing. Meanwhile, with the central passage and the side passage being spaced apart from each other and the tower packing elements arranged regularly like a structured tower packing, the flowing passage for the gas or liquid may be defined. Therefore, the pressure drop in the tower packing is reduced, and the processing capacity of the tower packing is further improved.

In some embodiments, each of the strip assemblies comprises a plurality of strip units arranged along the lateral direction of the tower packing element.

According to an embodiment of the present invention, the strip unit comprises a first edge and a second edge positioned at opposite sides of the connecting plate portion in a thickness direction of the tower packing element respectively and distributed staggerly along the lateral direction of the tower packing element, in which the first and second edges are parallel to each other.

In some embodiments, projections of the first edge and the second edge on a reference plane parallel to the first edge and the second edge define a first region, in which the first region has a shape of polygon having more than three sides.

Alternatively, the first region has a substantially rhombic shape or substantially hexagonal shape.

In an embodiment of the present invention, the polygon has at least two sides transitioned into each other via an arc.

In an embodiment of the present invention, the polygon has at least one arc-shaped side.

In an embodiment of the present invention, projections of the first edge and the second edge on a reference plane parallel to the first edge and the second edge define a first region, in which the first region has a circular shape or a substantially oval shape.

According an embodiment of the present invention, the strip unit further comprises a third edge and a fourth edge disposed staggerly along the lateral direction of the tower packing element, and positioned at opposite sides of the connecting plate portion in the thickness direction of the tower packing element and between the first edge and the second edge, in which the third and fourth edges are parallel to each other.

Alternatively, the second edge and the third edge are at the same side of the connecting plate portion in the thickness direction of the tower packing element, and the first edge and the fourth edge are at the same side of the connecting plate portion in the thickness direction of the tower packing element.

Alternatively, projections of the third edge and the fourth edge on the reference plane parallel to the first edge and the second edge define a second region, in which the second region has a shape of polygon having more than three sides, and the second region is partly overlapped with the first region.

In an embodiment of the present invention, the first region has a shape of a first tetragon, and the second region has a shape of a second tetragon, in which one diagonal of the first tetragon is coincided with one diagonal of the second tetragon, and the first tetragon and the second tetragon are symmetrical with respect to the one diagonal respectively.

In an embodiment of the present invention, the first tetragon or the second tetragon has at least two sides transitioned into each other via an arc.

In an embodiment of the present invention, the first tetragon or the second tetragon has at least one arc-shaped side.

Alternatively, projections of the third edge and the fourth edge on the reference plane parallel to the first edge and the second edge define a second region, in which the second region has a shape consisting of two diamonds connected via a connecting side.

In an embodiment of the present invention, at least one of the two diamonds has at least two sides transitioned into each other via an arc.

In an embodiment of the present invention, at least one of the two diamonds has at least one arc-shaped side.

According to an embodiment of the present invention, the first to fourth edges have the same width in the lateral direction of the tower packing element.

According to an embodiment of the present invention, an angle between an extending direction of the first edge and the lateral direction of the tower packing element ranges from 5 to 175 degrees.

According to an embodiment of the present invention, the deformed plate is a metal sheet, a plastic sheet, a ceramic sheet, or a metal mesh.

The tower packing element according to the present invention may improve the mass transferring efficiency, reduce the pressure drop and improve the processing capacity of the tower packing.

According to a second aspect of the present invention, a tower packing is provided. The tower packing comprises a plurality of tower packing elements described above, in which the plurality of tower packing elements are arranged parallel to each other in a thickness direction of the tower packing element, and the extending directions of the central passages of the adjacent tower packing elements are intersected.

According to a third aspect of the present invention, a packing tower is provided. The packing tower comprises: a tower body and a plurality of tower packings described above, and the tower packings are configured to transfer mass or heat of a gas-liquid stream or a liquid-liquid stream and arranged in the tower body along a flowing direction of the gas-liquid stream or the liquid-liquid stream, an angle between an extending direction of the central passage of the tower packing element and the flowing direction of the gas-liquid stream or the liquid-liquid stream is in a range of 0 to 180 degrees, and the longitudinal directions of the tower packing elements of the adjacent tower packings are intersected.

Alternatively, the extending directions of the central passages of the adjacent tower packing elements of each tower packing are inclined and symmetrical with respect to the flowing direction of the gas-liquid stream or the liquid-liquid stream.

According to a fourth aspect of the present invention, a mixer is provided. The mixer comprises: a mixer body and at least one tower packing described above, the tower packing is disposed in the mixer body and configured to mix a stream, in which the stream flows through the central passage and the side passage along the same direction.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1:
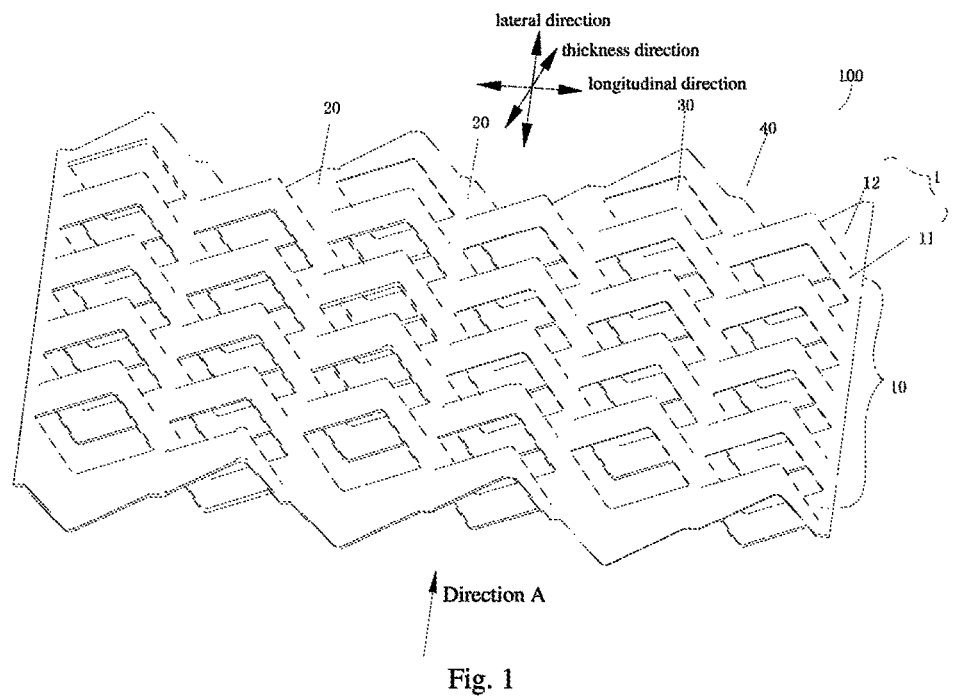
FIG. 1 is a schematic perspective view of a tower packing element for a tower packing according to an embodiment of the present invention.

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

In the specification, unless specified or limited otherwise, relative terms such as "longitudinal", "lateral", "a direction of thickness", "front", "rear", "right", "left", "inner", "outer", as well as derivative thereof (e.g., "horizontally", "downwardly", "upwardly", etc.) should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance. In the description of the present invention, "a plurality of" relates to two or more than two.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The tower packing element 100 for a tower packing will be described below with reference to FIGS. 1-13.

According to embodiments of the present invention, a tower packing element 100 for a tower packing is provided. The tower packing element 100 is manufactured by a deformed plate. In an embodiment, the deformed plate is a metal sheet, a plastic sheet, a ceramic sheet, or a metal mesh.

As shown in FIG. 1, the tower packing element 100 includes: a plurality of strip assemblies 10 arranged along a longitudinal direction of the tower packing element 100 and a connecting plate portion 20 connected between adjacent strip assemblies 10 and extended along a lateral direction of the tower packing element 100. Each of the strip assemblies 100 defines a central passage 30 therein, and the central passage 30 is extended in the lateral direction of the tower packing element 100. The adjacent strip assemblies 100 and the connecting plate portion 20 connected therebetween define a side passage 40 parallel to the central passage 30. A person having ordinary skill in the art will understand that the lateral direction is perpendicular to the longitudinal direction.

The tower packing element 100 according to embodiments of the present invention has a structure similar to that of a random tower packing in the related art, thus improving the amount of liquid held by the tower packing element 100 and a contact time between the gaseous phase and the liquid phase of the transferred gas-liquid stream or between the liquid phases of the transferred liquid-liquid stream, so as to improve the processing capacity of the tower packing element 100. In addition, with the central passage 30 and the side passage 40 being spaced apart from each other and arranged in a similar manner to a structured tower packing in the related art, flowing passages for liquid and gas are regulated in the tower packing. In this way, a pressure drop in the tower packing is reduced, thus improving the processing capacity of the tower packing element 100. It is to be understood that, the random tower packing and the structured tower packing are known to a person having ordinary skill in the art, such that detailed description thereof will be omitted herein.

As shown in FIG. 1, each of the strip assemblies 10 includes a plurality of strip units 1 arranged along the lateral direction of the tower packing element 100.

Referring to FIGS. 1-3b, the strip unit 1 includes a first edge 11 and a second edge 12. The first and second edges 11, 12 are positioned at opposite sides of the connecting plate portion 20 in a thickness direction of the tower packing element 100 respectively and distributed staggerly along the lateral direction of the tower packing element 100. The first and second edges 11, 12 are parallel to each other. A person having ordinary skill in the art will understand that the thickness direction is perpendicular to the plane defined by the lateral direction and the longitudinal direction.

In some embodiments, projections of the first edge 11 and the second edge 12 on a reference plane parallel to the first and second edges define a first region 15.

Figure 2:
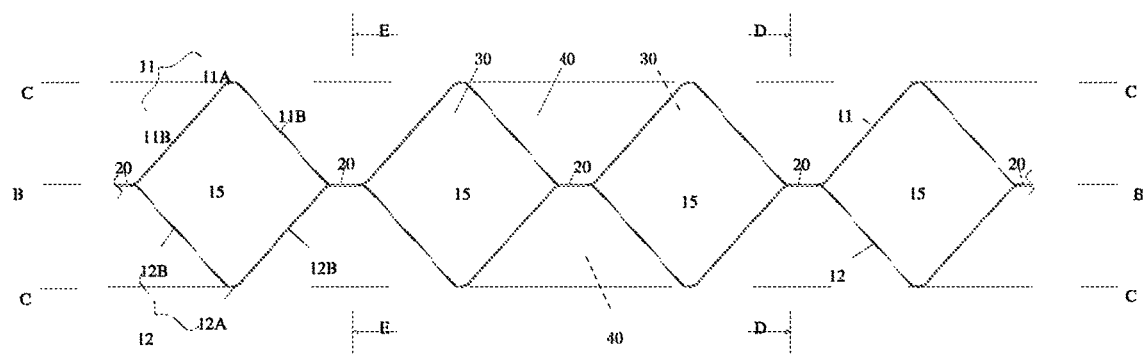
FIG. 2 is a cross-sectional view of the tower packing element in FIG. 1 viewed from a direction A.
Figure 3A:
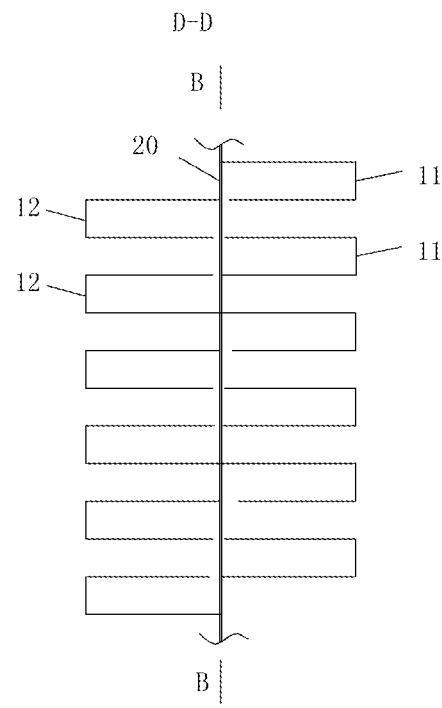
FIG. 3a is a cross-sectional view of the tower packing element in FIG. 2 viewed from a direction D.
Figure 3B:
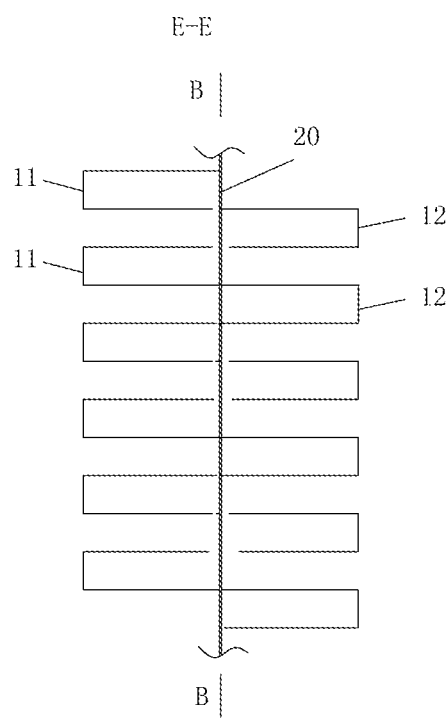
FIG. 3b is a cross-sectional view of the tower packing element in FIG. 2 viewed from a direction E.
Figure 5:
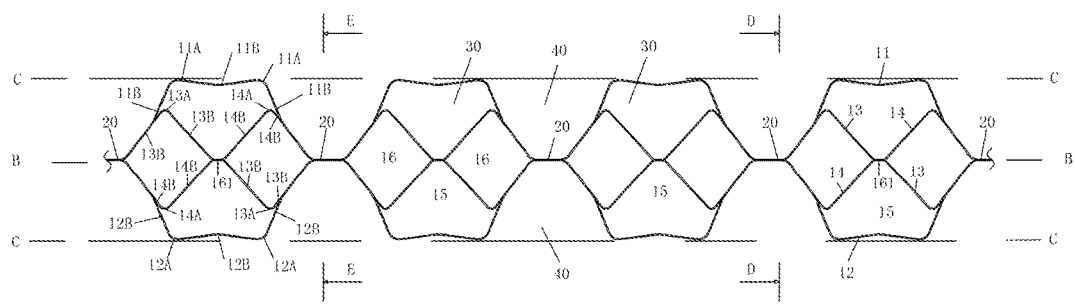
FIG. 5 is a cross-sectional view of the tower packing element in FIG. 4 viewed from a direction A.
Figure 6:
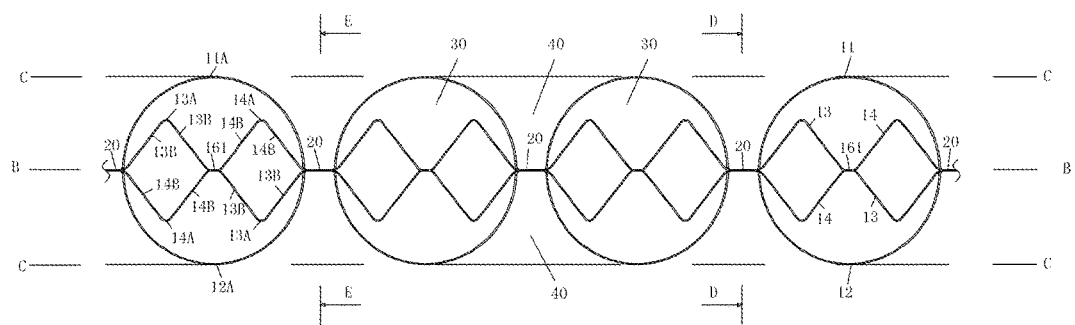
FIG. 6 is a cross-sectional view of the tower packing element in FIG. 4 according to another embodiment of the present invention viewed from a direction A.
Figure 7:
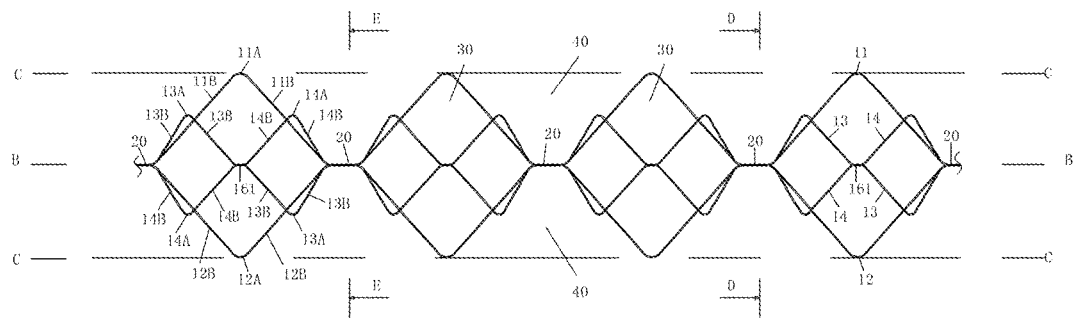
FIG. 7 is a cross-sectional view of the tower packing element in FIG. 4 according to a further embodiment of the present invention viewed from a direction A.
Figure 8:
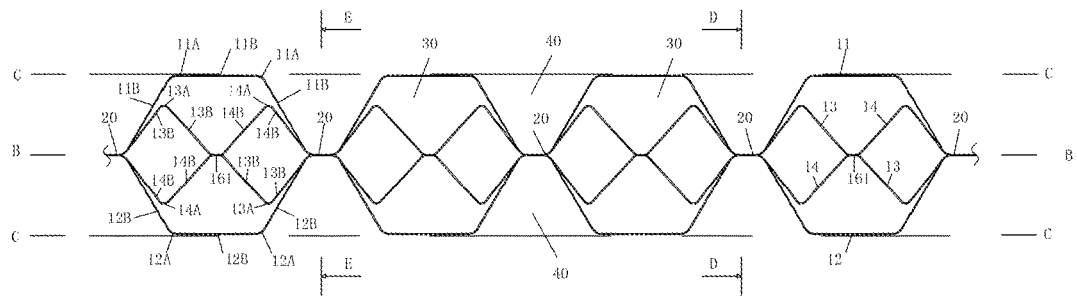
FIG. 8 is a cross-sectional view of the tower packing element in FIG. 4 according to a still further embodiment of the present invention viewed from a direction A.
Figure 9A:
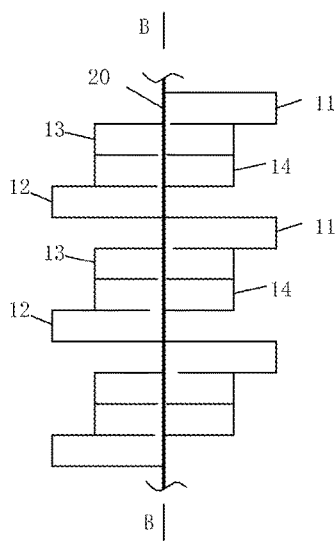
FIG. 9a is a cross-sectional view of the tower packing element in FIG. 5, FIG. 6, FIG. 7 or FIG. 8 viewed from a direction D.
Figure 9B:
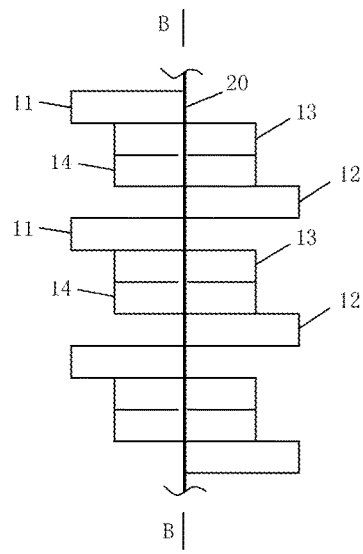
FIG. 9b is a cross-sectional view of the tower packing element in FIG. 5, FIG. 6, FIG. 7 or FIG. 8 viewed from a direction E.
Figure 10:
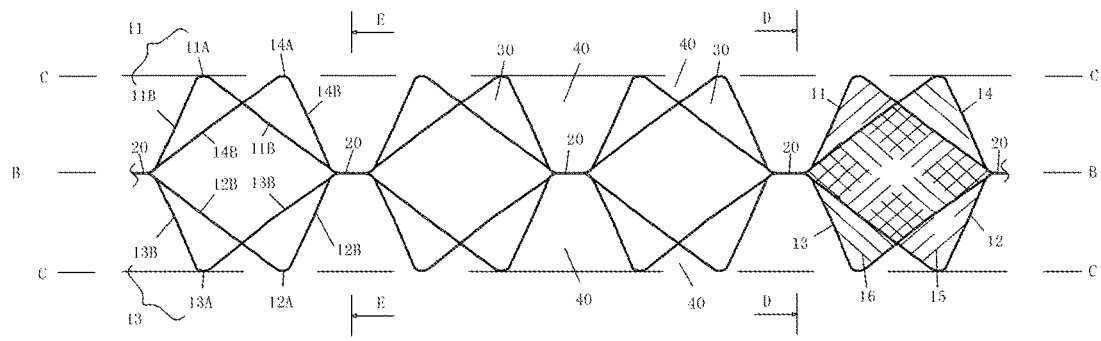
FIG. 10 is a cross-sectional view of a tower packing element according to an embodiment of the present disclosure viewed from a direction A.
Figure 11:
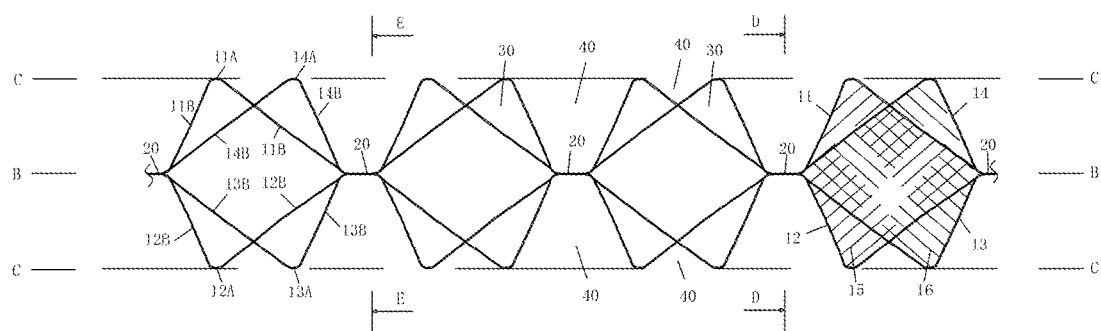
FIG. 11 is a cross-sectional view of a tower packing element according to another embodiment of the present disclosure viewed from a direction A.

The shape of the first region 15 is not limited. For example, the first region 15 may have a shape of polygon having more than three sides. Alternatively, the first region 15 may have a substantially rhombic shape, as shown in FIG. 2 and FIG. 7. In an embodiment, the first region 15 has a substantially hexagonal shape, as shown in FIG. 5 and FIG. 8. In some embodiments, the first region 15 may have an irregularly tetragonal shape or a rhomboid shape, as shown in FIG. 10 and FIG. 11. For example and without limits, the first region 15 may have a circular shape as shown in FIG. 6 or a substantially oval shape (not shown).

In an embodiment of the present invention, when the first region 15 has a shape of a polygon, the polygon has at least two sides transitioned into each other via an arc. Specifically, as shown in FIGS. 2, 5, 7-8, the first edge 11 includes at least two first straight segments 11B and at least one first arc-shaped segment 11A connected between adjacent first straight segments 11B, and the second edge 12 includes at least two second straight segments 12B and at least one second arc-shaped segment 12A connected between adjacent second straight segments 12B.

As shown in FIG. 2, the first region 15 has a substantially rhombic shape. The first edge 11 includes two first straight segments 11B and one first arc-shaped segment 11A connected between the two first straight segments 11B, and the second edge 12 includes two second straight segments 12B and one second arc-shaped segment 12A connected between the two second straight segments 12B.

As shown in FIG. 5, the first region 15 has a substantially hexagonal shape. The first edge 11 includes three first straight segments 11B and two first arc-shaped segment 11A each connected between two adjacent first straight segments 11B, and the second edge 12 includes three second straight segments 12B and two second arc-shaped segment 12A each connected between two adjacent second straight segments 12B.

Figure 4:
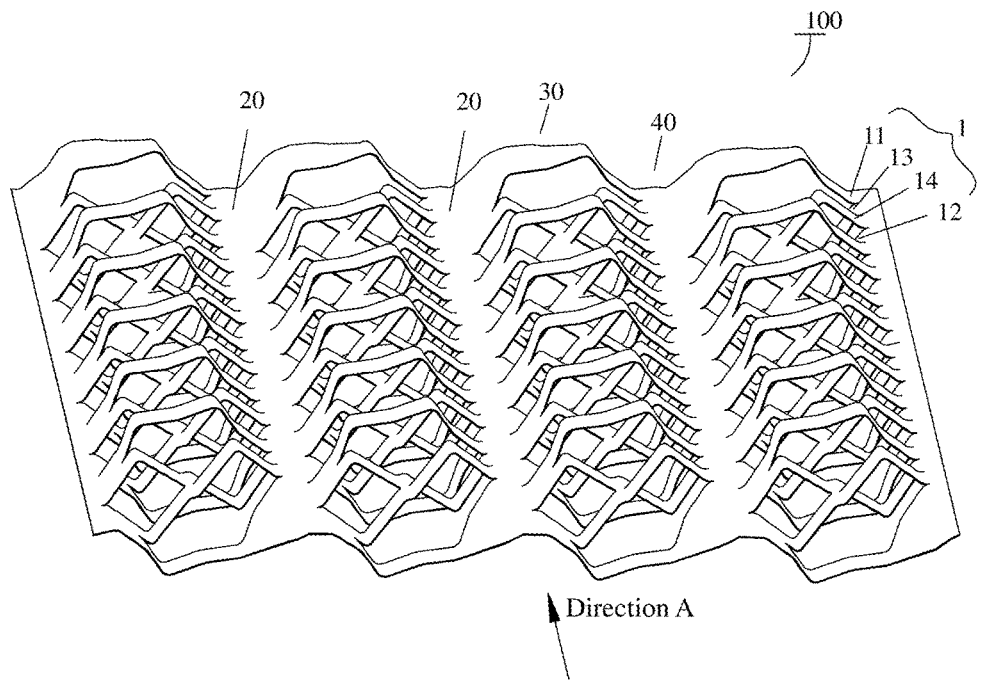
FIG. 4 is a schematic perspective view of a tower packing element according to another embodiment of the present invention.

In some embodiments, the polygon has at least one arc-shaped side. Specifically, as shown in FIGS. 4-5, the first straight edge 11B and the second straight edge 12B are arc-shaped sides.

Figure 12A:
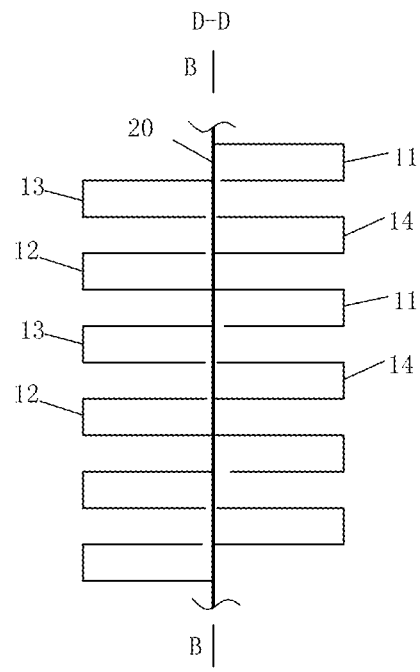
FIG. 12a is a cross-sectional view of the tower packing element in FIG. 10 or FIG. 11 viewed from a direction D.
Figure 12B:
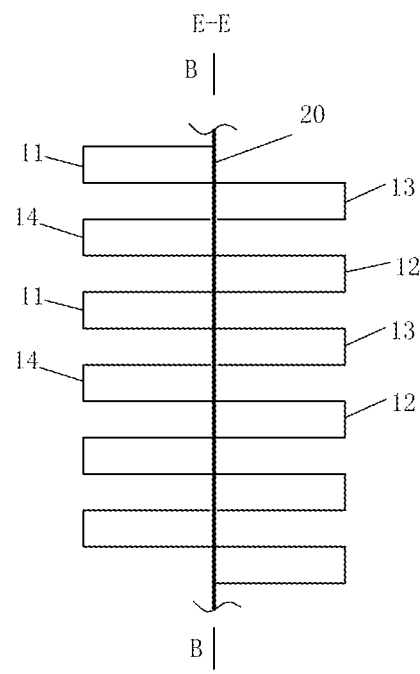
FIG. 12b is a cross-sectional view of the tower packing element in FIG. 10 or FIG. 11 viewed from a direction E.

As shown in FIGS. 10-11, the strip unit 1 further includes a third edge 13 and a fourth edge 14. The third and fourth edges 13, 14 are disposed staggerly along the lateral direction of the tower packing element 100, and positioned at opposite sides of the connecting plate portion 20 in the thickness direction of the tower packing element 100 and between the first edge 11 and the second edge 12, as shown in FIGS. 12a-12b. In addition, the third and fourth edges 13, 14 are parallel to each other.

As shown in FIGS. 10-11, the second edge 12 and the third edge 13 are at the same side of the connecting plate portion 20 in the thickness direction of the tower packing element 100, and the first edge 11 and the fourth edge 14 are at the same side of the connecting plate portion 20 in the thickness direction of the tower packing element 100.

In some embodiments, projections of the third edge 13 and the fourth edges 14 on a reference plane parallel to the first edge 11 and the second edge 12 define a second region 16. The second region 16 has a shape of polygon having more than three sides, and the second region 16 is partly overlapped with the first region 15.

As shown in FIGS. 10 and 11, the first region 15 has a shape of a first tetragon, and the second region 16 has a shape of a second tetragon. One diagonal of the first tetragon is coincided with one diagonal of the second tetragon, and the first and second tetragons are symmetrical with respect to the one diagonal respectively.

In some embodiments, each of the first and second tetragons has at least two sides transitioned into each other via an arc. Specifically, as shown in FIGS. 10-11, the first edge 11 includes two first straight segments 11B and one first arc-shaped segment 11A connected between the two first straight segments 11B, the second edge 12 includes two second straight segments 12B and one second arc-shaped segment 12A connected between the two second straight segments 12B, the third edge 13 includes two third straight segments 13B and one third arc-shaped segment 13A connected between the two third straight segments 13B, and the fourth edge 14 includes two fourth straight segments 14B and one fourth arc-shaped segment 14A connected between the two fourth straight segments 14B.

In some embodiments, each of the first tetragon and/or the second tetragon has at least one arc-shaped side.

As shown in FIGS. 5-8, projections of the third edge 13 and the fourth edge 14 on a reference plane parallel to the first edge 11 and the second edge 12 define a second region 16, and the second region 16 has a shape consisting of two diamonds connected via a connecting side 161. In other words, as shown in FIGS. 5-8, the third edge 13 and the fourth edge 14 are disposed staggerly in the reference plane, thus forming a substantially X-shaped structure.

In some embodiments, at least one of the two diamonds has at least two sides transitioned into each other via an arc. Specifically, as shown in FIGS. 5-8, the third edge 13 includes two third straight segments 13B and one third arc-shaped segment 13A connected between the two third straight segments 13B, and the fourth edge 14 includes two fourth straight segments 14B and one fourth arc-shaped segment 14A connected between the two fourth straight segments 14B.

In some embodiments, at least one of the two diamonds has at least one arc-shaped side, as shown in FIG. 5.

The first to fourth edges 11 to 14 have the same width in the lateral direction of the tower packing element 100, as shown in FIGS. 3a-3b, 9a-9b, and 12a-12b.

In some embodiments, an angle between an extending direction of the first edge 11 and the lateral direction of the tower packing element 100 ranges from 5 to 175 degrees, i.e., an angle between the lateral direction of the tower packing element 100 and the reference plane parallel to the first edge 11 and the second edge 12 ranges from 5 to 175 degrees.

The tower packing element according to the present invention may improve the mass transferring efficiency, reduce the pressure drop and improve the processing capacity of the tower packing.

Figure 13:
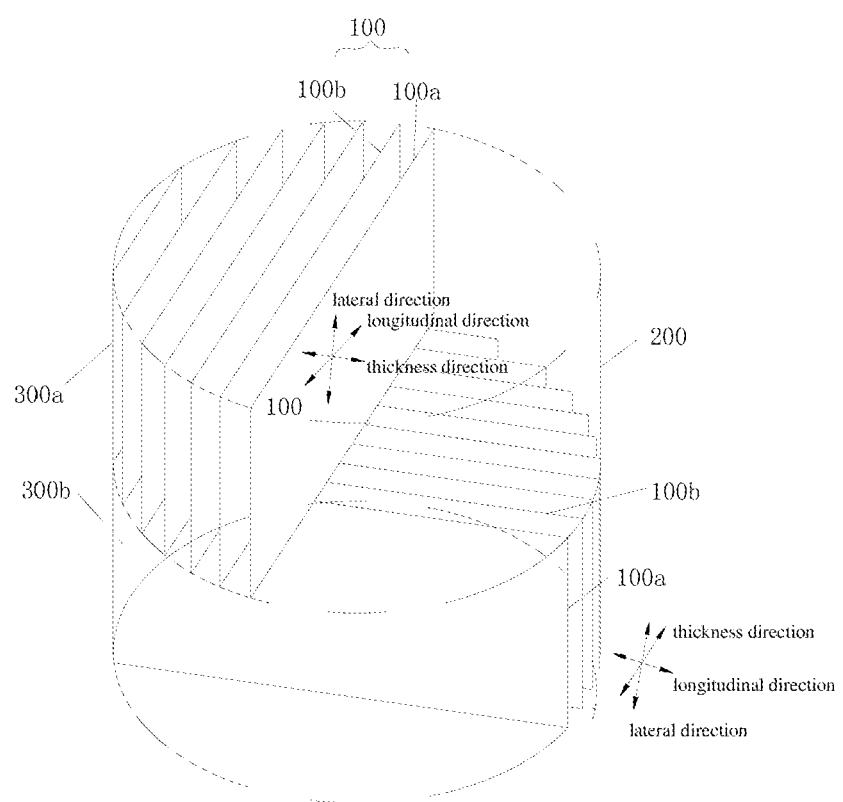
FIG. 13 is a schematic partial view of a packing tower according to an embodiment of the present invention.

According to embodiments of a second aspect of the present invention, a tower packing 300 is provided. The tower packing 300 includes a plurality of tower packing elements 100 described above. The plurality of tower packing elements 100 are arranged parallel to each other in a thickness direction of the tower packing element 100, and extending directions of the central passages 30 of adjacent tower packing elements 100 are intersected, as shown in FIG. 13.

According to embodiments of a third aspect of the present invention, a packing tower is provided. The packing tower includes a tower body 200 and a plurality of tower packings 300 described above. The plurality of tower packings 300 are configured to transfer mass or heat of a gas-liquid stream or a liquid-liquid stream and arranged in the tower body 200 along a flowing direction of the gas-liquid stream or the liquid-liquid stream. An angle between an extending direction of the central passage 30 of the tower packing element 100 and the flowing direction of the gas-liquid stream or the liquid-liquid stream is in a range of 0 to 180 degrees, and longitudinal directions of the tower packing elements 100 of adjacent tower packings 300 are intersected. Specifically, as shown in FIG. 13, two tower packings 300a and 300b are disposed adjacent to each other in an up and down direction, and the longitudinal directions of the tower packing 300a and the tower packing 300b are intersected.

In some embodiments, the extending directions of central passages 30 of adjacent tower packing elements 100 of each tower packing are inclined and symmetrical with respect to the flowing direction of the gas-liquid stream or the liquid-liquid stream. For example, in the packing tower shown in FIG. 13, the flowing direction of the gas-liquid stream or the liquid-liquid stream is an axial direction of the tower body 200, i.e., the up and down direction. The extending direction of the central passage 30 of the tower packing element 100a of each tower packing 300 is the lateral direction of the tower packing element 100a, and the extending direction of the central passage 30 of the tower packing element 100b of the each tower packing adjacent to the tower packing element 100a is the lateral direction of the tower packing element 100b. The lateral directions of the tower packing element 100a and the tower packing element 100b are inclined oppositely to each other and symmetrical with respect to the flowing direction of the gas-liquid stream or the liquid-liquid stream.

According to embodiments of a fourth aspect of the present invention, a mixer is provided. The mixer includes a mixer body, and at least one tower packing described above. The tower packing is disposed in the mixer body and configured to mix a stream. The stream flows through the central passage and the side passage along the same direction.

Each of the tower packing element, the tower packing, the packing tower, and the mixer according to embodiments of the present invention may comprise other components known to a person having ordinary skill in the art, such that detailed description thereof will be omitted herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by a person having ordinary skill in the art that the above embodiments cannot be construed to limit the present invention, and changes, alternatives, and modifications can be made in the embodiments without departing from spirit, principles and scope of the present invention.

What is claimed is:

1. A tower packing element manufactured by a deformed plate and comprising:
    a plurality of strip assemblies arranged along a longitudinal direction of the tower packing element, each of the strip assemblies defining a central passage therein, and the central passage being extended in a lateral direction of the tower packing element, and
    a connecting plate portion connected between adjacent strip assemblies and extended along the lateral direction of the tower packing element,
    wherein the adjacent strip assemblies and the connecting plate portion connected therebetween define a side passage parallel to the central passage,
    wherein each of the strip assemblies includes a plurality of strip units arranged along the lateral direction of the tower packing element,
    wherein the strip unit includes first and second edges positioned at opposite sides of the connecting plate portion in a thickness direction of the tower packing element respectively,
    wherein an angle between an extending direction of the first edge and the lateral direction of the tower packing element ranges from 5 to 175 degrees and the first edge is inclined with respect to the lateral direction of the tower packing element.

2. The tower packing element according to claim 1, wherein the deformed plate is a metal sheet, a plastic sheet, a ceramic sheet, or a metal mesh.

3. The tower packing element according to claim 1, wherein the first and second edges are distributed staggerly along the lateral direction of the tower packing element, and the first and second edges are parallel to each other.

4. The tower packing element according to claim 3, wherein projections of the first and second edges on a reference plane parallel to the first and second edges define a first region,
    wherein the first region has a circular shape or a substantially oval shape.

5. The tower packing element according to claim 3, wherein the strip unit further includes third and fourth edges disposed staggerly along the lateral direction of the tower packing element, and positioned at opposite sides of the connecting plate portion in the thickness direction of the tower packing element and between the first and second edges,
    wherein the third and fourth edges are parallel to each other.

6. The tower packing element according to claim 5, wherein the second and third edges are at the same side of the connecting plate portion in the thickness direction of the tower packing element, and the first and fourth edges are at the same side of the connecting plate portion in the thickness direction of the tower packing element.

7. The tower packing element according to claim 6, wherein projections of the third and fourth edges on the reference plane parallel to the first and second edges define a second region,
    wherein the second region has a shape of polygon having more than three sides, and the second region is partly overlapped with the first region.

8. The tower packing element according to claim 7, wherein the first region has a shape of a first tetragon, and the second region has a shape of a second tetragon,
    wherein one diagonal of the first tetragon is coincided with one diagonal of the second tetragon, and the first and second tetragons are symmetrical with respect to the one diagonal respectively.

9. The tower packing element according to claim 8, wherein the first tetragon or the second tetragon has at least two sides transitioned into each other via an arc.

10. The tower packing element according to claim 6, wherein projections of the third and fourth edges on the reference plane parallel to the first and second edges define a second region,
    wherein the second region has a shape consisting of two diamonds connected via a connecting side.

11. The tower packing element according to claim 5, wherein the first to fourth edges have the same width in the lateral direction of the tower packing element.

12. The tower packing element according to claim 3, wherein projections of the first and second edges on a reference plane parallel to the first and second edges define a first region,
    wherein the first region has a shape of polygon having more than three sides.

13. The tower packing element according to claim 12, wherein the polygon has at least two sides transitioned into each other via an arc.

14. The tower packing element according to claim 12, wherein the first region has a substantially hexagonal shape.

15. The tower packing element according to claim 12, wherein the first region has a substantially rhombic shape.

16. A tower packing comprising a plurality of tower packing elements, wherein
    the tower packing element is manufactured by a deformed plate and comprises: a plurality of strip assemblies arranged along a longitudinal direction of the tower packing element, each of the strip assemblies defining a central passage therein, and the central passage being extended in a lateral direction of the tower packing element; and a connecting plate portion connected between adjacent strip assemblies and extended along the lateral direction of the tower packing element;
    the adjacent strip assemblies and the connecting plate portion connected therebetween define a side passage parallel to the central passage, wherein each of the strip assemblies includes a plurality of strip units arranged along the lateral direction of the tower packing element, wherein the strip unit includes first and second edges positioned at opposite sides of the connecting plate portion in a thickness direction of the tower packing element respectively, wherein an angle between an extending direction of the first edge and the lateral direction of the tower packing element ranges from 5 to 175 degrees and the first edge is inclined with respect to the lateral direction of the tower packing element; and the plurality of tower packing elements are arranged parallel to each other in a thickness direction of the tower packing element, and extending directions of the central passages of adjacent tower packing elements are intersected.

17. A packing tower comprising:

a tower body, and a plurality of tower packings configured to transfer mass or heat of a gas-liquid stream or a liquid-liquid stream and arranged in the tower body along a flowing direction of the gas-liquid stream or the liquid-liquid stream, wherein the tower packing comprises a plurality of tower packing elements, the tower packing element is manufactured by a deformed plate and comprises: a plurality of strip assemblies arranged along a longitudinal direction of the tower packing element, each of the strip assemblies defining a central passage therein, and the central passage being extended in a lateral direction of the tower packing element; and a connecting plate portion connected between adjacent strip assemblies and extended along the lateral direction of the tower packing element;

the adjacent strip assemblies and the connecting plate portion connected therebetween define a side passage parallel to the central passage, wherein each of the strip assemblies includes a plurality of strip units arranged along the lateral direction of the tower packing element, wherein the strip unit includes first and second edges positioned at opposite sides of the connecting plate portion in a thickness direction of the tower packing element respectively, wherein an angle between an extending direction of the first edge and the lateral direction of the tower packing element ranges from 5 to 175 degrees and the first edge is inclined with respect to the lateral direction of the tower packing element;

the plurality of tower packing elements are arranged parallel to each other in a thickness direction of the tower packing element, and extending directions of the central passages of adjacent tower packing elements are intersected; and an angle between an extending direction of the central passage of the tower packing element and the flowing direction of the gas-liquid stream or the liquid-liquid stream is in a range of 0 to 180 degrees, lateral directions of the tower packing elements of each tower packing are arranged along the direction of the gas-liquid stream or the liquid-liquid stream and longitudinal directions of the tower packing elements of adjacent tower packings are intersected.

18. The tower according to claim 17, wherein the extending directions of central passages of adjacent tower packing elements of each tower packing are inclined and symmetrical with respect to the flowing direction of the gas-liquid stream or the liquid-liquid stream.

19. A mixer comprising:

a mixer body, and at least one tower packing disposed in the mixer body and configured to mix a stream, wherein the tower packing comprises a plurality of tower packing elements, wherein the tower packing element is manufactured by a deformed plate and comprises: a plurality of strip assemblies arranged along a longitudinal direction of the tower packing element, each of the strip assemblies defining a central passage therein, and the central passage being extended in a lateral direction of the tower packing element; and a connecting plate portion connected between adjacent strip assemblies and extended along the lateral direction of the tower packing element;

the adjacent strip assemblies and the connecting plate portion connected therebetween define a side passage parallel to the central passage, wherein each of the strip assemblies includes a plurality of strip units arranged along the lateral direction of the tower packing element, wherein the strip unit includes first and second edges positioned at opposite sides of the connecting plate portion in a thickness direction of the tower packing element respectively, wherein an angle between an extending direction of the first edge and the lateral direction of the tower packing element ranges from 5 to 175 degrees and the first edge is inclined with respect to the lateral direction of the tower packing element;

the plurality of tower packing elements are arranged parallel to each other in the thickness direction of the tower packing element, and extending directions of the central passages of adjacent tower packing elements are intersected; and the stream flows through the central passage and the side passage along the same direction.

* * * * *